US007195172B1

(12) United States Patent
Scarafile et al.

(10) Patent No.: US 7,195,172 B1
(45) Date of Patent: Mar. 27, 2007

(54) AUTOMATED BANKING MACHINE ANTI-SKIMMING CARD READER

(75) Inventors: Pietro Scarafile, Settimo Torinese (IT); Emilio Caligaris Cappio, Biella (IT)

(73) Assignee: Diebold Self-Service Systems, Incorporated, North Canton, OH (US)

( * ) Notice: Subject to any disclaimer, the term of this patent is extended or adjusted under 35 U.S.C. 154(b) by 0 days.

(21) Appl. No.: 11/516,268

(22) Filed: Sep. 6, 2006

Related U.S. Application Data

(60) Provisional application No. 60/715,667, filed on Sep. 9, 2005.

(51) Int. Cl.
*G06K 7/00* (2006.01)
(52) U.S. Cl. ........................ 235/486; 235/475; 235/485
(58) Field of Classification Search ................ 235/486, 235/485, 487, 475
See application file for complete search history.

(56) References Cited

U.S. PATENT DOCUMENTS

| | | | |
|---|---|---|---|
| 3,836,753 A | * | 9/1974 | Pass ............................ 235/449 |
| 4,798,942 A | * | 1/1989 | Aubrey ........................ 235/384 |
| 4,929,821 A | * | 5/1990 | Kocznar et al. ............ 235/493 |
| 5,438,186 A | * | 8/1995 | Nair et al. .................. 235/449 |
| 6,460,771 B1 | | 10/2002 | May |

OTHER PUBLICATIONS

J. Svigals, "Unauthorized Card Stripe Reading Inhibitor", IBM Technical Disclosure Bulletin, vol. 26, No. 6, Nov. 1, 1983, p. 2707 XP002145300, New York.

* cited by examiner

*Primary Examiner*—Kimberly D. Nguyen
(74) *Attorney, Agent, or Firm*—Christopher L. Parmclee; Ralph E. Jocke; Walker & Jocke

(57) ABSTRACT

A card reader for an automated banking machine is provided. The card reader includes a processor and a card transport. The card transport moves at least one card a plurality of cycles between a first position and a second position within the card transport. The card transport continuously moves the card in a first direction for a first time period at a first speed, then continuously moves the card in the first direction for a second time period at a second speed which is slower than the first speed. Subsequent to the second time period, the card transport moves the card in the first direction for a third time period, during which the card stops and starts moving more than five times. Both the second and third time periods vary from cycle to cycle responsive to a variable parameter determined by the at least one processor.

33 Claims, 5 Drawing Sheets

AUTOMATED BANKING MACHINE ANTI-SKIMMING CARD READER

CROSS REFERENCE TO RELATED APPLICATIONS

This application claims benefit of U.S. Provisional Application Ser. No. 60/715,667 filed Sep. 9, 2005, which is hereby incorporated herein by reference.

TECHNICAL FIELD

This invention relates to an anti-skimming card reader. Specifically this invention relates to a card reader for an automated banking machine which operates in a manner which minimizes the opportunity for unauthorized skimming devices to read user information from a card.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The types of banking transactions a customer can carry out are determined by capabilities of the particular machine and the programming of the institution operating the machine. Other types of automated banking machines may allow customers to charge against accounts, to pay bills, to transfer funds or to cash checks. Other types of automated banking machines may print or dispense items of value such as coupons, tickets, wagering slips, vouchers, checks, food stamps, money orders, scrip or travelers checks. For purposes of this disclosure, references to an ATM, an automated banking machine or automated transaction machine shall encompass any device which carries out transactions including transfers of value.

ATMs often include card readers which are operative to read account information from a user's card such as a bank card, credit card, debit card, or any other kind of card capable of supplying the ATM with information usable to perform a financial transaction. Such cards may include a magnetic stripe in which account information is magnetically written to the card. The Card reader may include a magnetic reading device, which is operative to read the magnetically written account information from the magnetic stripe of the card. Such magnetic reading devices may include a magnetic sensor which is relatively smaller than the magnetic stripe of the card. Thus some card readers may also include a motorized transport which is operative to move the card across the magnetic sensor so that all of the portions of the magnetic stripe which contain account information can be read by the magnetic reading device. With these motorized card readers, the user partially inserts their card into a slot in the card reader at which time a sensor in the card reader detects the card and triggers the transport to begin moving the card further into the card reader adjacent the magnetic sensor.

Unfortunately prior art motorized card readers are susceptible to being used by thieves to acquire the account information from the user's card. This has been done by placing an unauthorized magnetic stripe reading device adjacent and/or inside the card slot of the card reader and/or ATM. Such an unauthorized device may be constructed to match the visual appearance of the fascia of the ATM to trick a user into thinking that the device is an integral feature of the ATM.

As the motorized card reader moves the card into or out of the card reader, a magnetic sensor in the unauthorized device is operative to read account information from the magnetic stripe of the card. An unauthorized hidden camera may also be mounted to or near the ATM in a position to visually record the user typing their account PIN into the keypad of the ATM. Through use of unauthorized magnetic stripe readers and/or hidden cameras a thief may acquire sufficient information to steal money from the user's account.

Thus, there exists a need for a card reader which is operative to minimize the opportunity for thieves to skim a user's account information using an unauthorized magnetic stripe reading device.

DISCLOSURE OF INVENTION

It is an object of an exemplary embodiment to provide a card reader device.

It is a further object of an exemplary embodiment to provide an anti-skimming card reader device that is operative to minimize the ability of an unauthorized skimming device from acquiring account information from the card.

It is a further object of an exemplary embodiment to provide an automated banking machine which includes an anti-skimming card reader device.

Further objects of exemplary embodiments will be made apparent in the following Best Modes For Carrying Out Invention and the appended claims.

The foregoing objects may be accomplished in an exemplary embodiment by an automated banking machine that includes output devices such as a display screen and receipt printer. The machine may further include input devices such as a touch screen, keyboard, keypad, function keys, and a card reader as described in more detail below. The automated banking machine may further include transaction function devices such as a cash dispenser mechanism for sheets of currency, a depository mechanism and other transaction function devices which are used by the machine in carrying out banking transactions including transfers of value. In the exemplary embodiment the automated banking machine may include at least one computer. The computer may be in operative connection with the output devices and the input devices, as well as with the cash dispenser mechanism, depository mechanism and other physical transaction function devices in the banking machine. The computer may further be operative to communicate with a host system located remotely from the machine.

In the exemplary embodiment, the computer may include software programs that are executable therein. The software programs of the automated banking machine may be operative to cause the computer to output user interface screens through a display device of the machine. The user interface screens may include consumer screens which provide a consumer with information for performing consumer operations such as banking functions with the machine. The user interface screens may further include service screens which provide an authorized user servicing the machine with information for performing service and maintenance operations with the machine. In addition, the machine may further include software programs operative in the computer for controlling and communicating with hardware devices of the machine including the transaction function devices.

In an embodiment, the machine may include a card reader that corresponds to a motorized card reader capable of transporting a card so that a magnetic stripe on the card moves across a magnetic sensor in the car reader. As the card moves, the magnetic sensor is operative to read magnetic information stored on the magnetic stripe which is representative of card data such as an account number, financial institution number, and/or other information. Such card data may be used by the automated banking machine to further carrying out transactions such as dispensing cash, depositing a check and/or debiting and/or crediting an account associated with card data read from the card.

To prevent a magnetic sensor of an unauthorized skimming device from reading the magnetic information form the card, the card reader may move the card with motions which interfere with the ability of an unauthorized magnetic sensor to accurately read information from the card.

In an embodiment of the card reader, a processor may determine at least one variable parameter. The variable parameter may be determined randomly. Also, the variable parameter may be determined responsive to a predetermined pattern or sequence. The variable parameter may also be retrieved from predetermined data (whether random or not) stored in a data store of the card reader. As will be described below in more detail the determined variable parameter may be used to produce variations in the duration of different kinds of card motions produced by a card transport in the card reader.

In an embodiment, when a user inserts their card into an opening into the card reader, a sensor in the card reader may detect the presence of the card. The processor responsive to the sensor may cause the card transport to continuously move the card in a first direction further into the card reader for a first time period at a first speed. Subsequent to the first time period, the processor may cause the card transport to continuously move the card in the first direction for a second time period at a second speed. The second speed may be slower than the first speed. Also the second time period may have a duration that is produced responsive to the at least one variable parameter. Subsequent to the second time period, the processor may cause the card transport to move the card in the first direction for a third time period during which the card stops and starts moving more than five times. The third time period may have a duration that is produced responsive to the duration of the second time period.

Subsequent to the third time period, the processor may cause the card transport to move the card in the first direction for a fourth time period at a third speed which is greater than the second speed. At the end of the third time period, the card may be fully inside the card reader. Thus, during the fourth time period, the third speed may be sufficient to enable an (authorized) magnetic sensor located inside the card reader to read the card information stored magnetically on the card.

To prevent an unauthorized magnetic sensor from reading the card data from the card during the third time period, each stop of the card may have a duration that is sufficiently long to cause a magnetic sensor for at least 10 msec to produce a signal which is not distinguishable from noise. Thus, in one embodiment, each stop may have a fixed duration of at least 10 msec. However, in other embodiments, the durations that the card remains stopped may have a different duration and/or may vary from stop to stop. For example, the duration of each stop may vary randomly, may vary based on a predetermined pattern or sequence, and/or may vary responsive to predetermined data stored in a data store.

Thus each time the card reader moves a card or a further card through the previously described set of motions, (referred to herein as a cycle), the second and third time periods vary in duration responsive to the respective variable parameters determined by the processor for that respective cycle of motions. The variation in the duration of the third time period results in a different number of times the card is stopped. Also, the variation in the duration of the second and third time periods causes the distance the card moves during both the second and third time periods to be different. However, in an embodiment of the card reader, the total of the distance moved during the second and third time periods may be the same from cycle to cycle.

For example, for each cycle the second time period may begin when the card is in a common position and the third time period may end when the card is positioned at another common position. These positions may be determined based on sensors in the card which are operative to determine at least one of the presence or absence of a card. For example, during the second time period, a sensor may be operative to detect at least one of the presence or absence of the card, and responsive thereto, the processor may cause the card transport to continue moving the card at the same second speed for an additional time period which is determined responsive to the variable parameter. Then during the third time period, a further card position sensor may be operative to detect at least one of the presence or absence of the card, and responsive thereto, the processor may cause the card transport to switch motions and begin the fourth time period in which the card moves with the third speed in a continuous manner.

Because the position of the card at the end of the second time period will vary, the distance the card must travel during the third time period before the further sensor is activated will vary (in inverse proportion) as well. Consequently the duration of the third time period and/or the number of stops of the card during the third time period will vary responsive to the variable parameter.

When a user is finished using the automated banking machine, the automated banking machine may be operative to send the card reader an eject command which causes the card reader to return the card to the user. Responsive to receiving the eject command, the card reader may begin to move the card in a second direction opposite the first direction with motions similar to those described previously. For example, the processor may cause the card transport to continuously move the card in the second direction at a fourth speed for a fifth time period. In an embodiment, the fourth speed may be greater than the third speed. Prior to the card extending through the opening, the processor may cause the card transport to move the card in the second direction for a sixth time period during which the card stops and starts moving more than five times. The sixth time period may have a duration which is produced responsive to the at least one variable parameter. At the end of the sixth time period the card extends out the opening.

In this described process of ejecting the card, subsequent to the sixth time period, the processor may cause the card transport to continuously move the card in the second direction for a seventh time period at a fifth speed. In an embodiment the fifth speed may correspond to the second speed and/or be slower than the first, third, and fourth speeds described previously. During the seventh time period a card position sensor may sense at least one of the presence or absence of the card and responsive thereto, the processor may cause the card transport to stop.

At this point the user may pull the card from the card reader. However, if the user pushes the card further into the card reader, the processor may again be operative to cause the card transport to continuously move the card in the second direction until the card position sensor senses at least one of the presence or absence of the card.

If the card is not taken by the user after a predetermined amount of time, the processor is operative to cause the transport to retrieve the card. The process of retrieving the card may include moving the card back into the card reader in the first direction using motions similar to those described with respect to the second, third and fourth time periods.

BEST MODES FOR CARRYING OUT INVENTION

Figure 1:
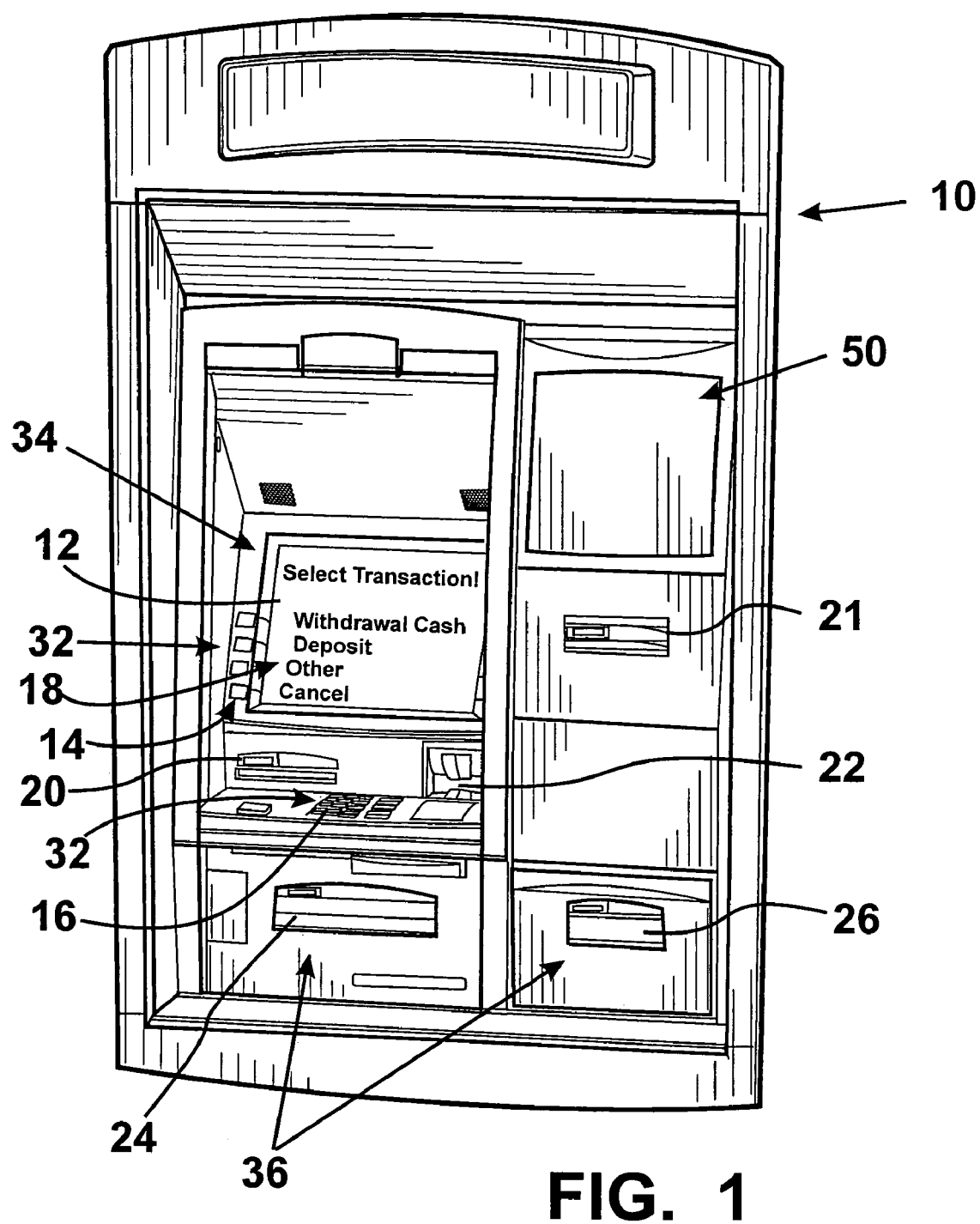
FIG. 1 is a perspective view representative of an exemplary embodiment of an automated banking machine.

Referring now to the drawings and particularly to FIG. 1, there is shown therein a perspective view of an exemplary automated banking machine such as an automated teller machine (ATM) 10 with a fascia 50 though which devices for performing transactions are accessed by a user. Here the automated banking machine 10 may include at least one output device 34 such as a display device 12. The display device 12 may be operative to provide a consumer with a user interface 18 that may include a plurality of screens or other outputs including selectable options for operating the machine. The exemplary embodiment may further include other types of output devices such as a receipt printer 20, statement printer 21, speakers, or any other type of device that is capable of outputting visual, audible, or other sensory perceptible information.

The exemplary embodiment of the automated banking machine 10 may include a plurality of input devices 32 such as: an encrypting pin pad with keypad 16; function keys 14; as well as a card reader 22. The exemplary embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user.

The exemplary embodiment of the automated banking machine 10 may further include a plurality of transaction function devices 36 which may include for example a cash dispenser 24, a depository mechanism 26, cash recycler mechanism, or any other type of device which is operative to perform transaction functions involving transfers of value.

Figure 2:
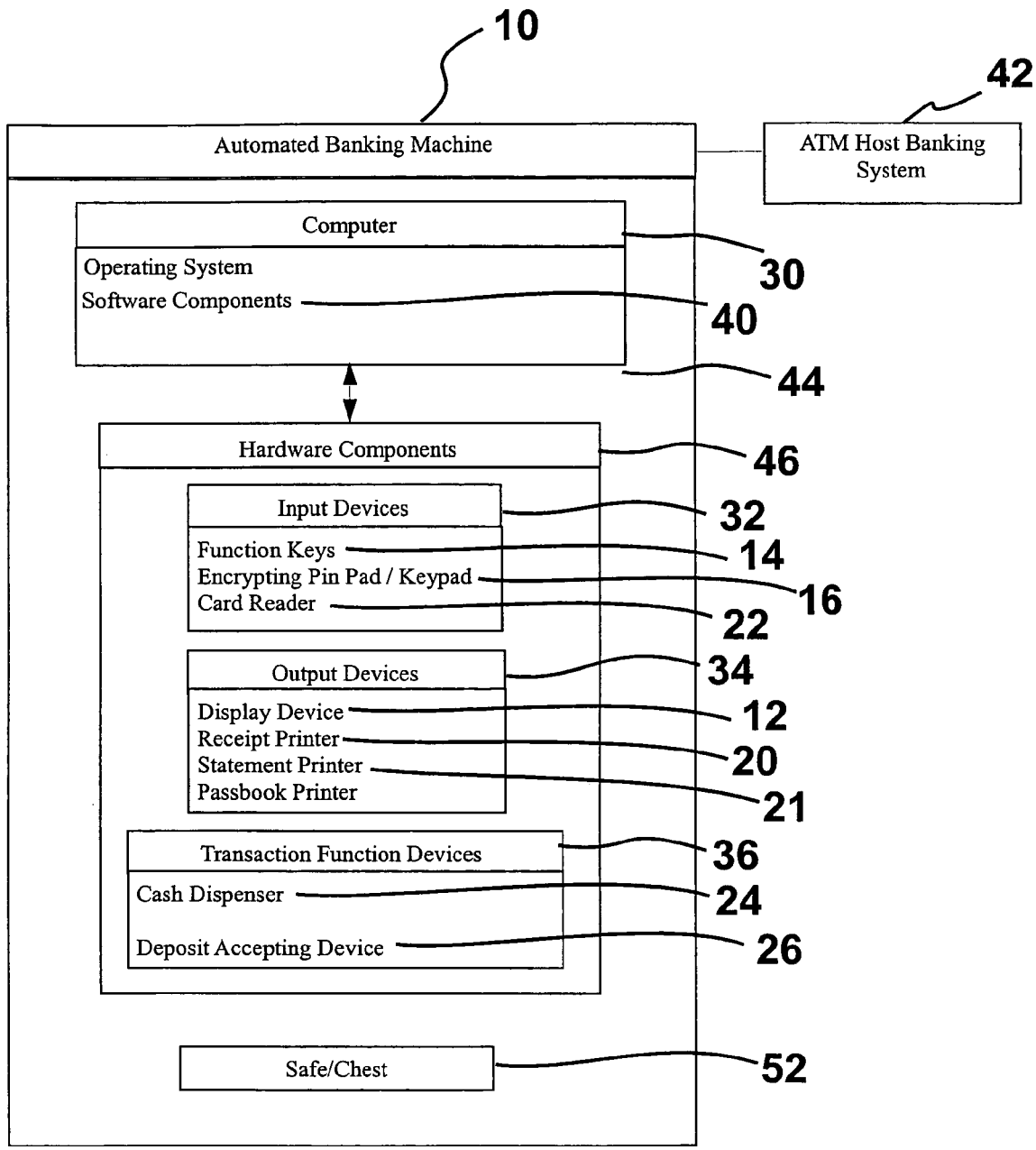
FIG. 2 is a schematic view of a further exemplary embodiment of an automated banking machine.

FIG. 2 shows a schematic view of components which may be included in the automated banking machine 10. The machine 10 may include at least one computer 30. The computer 30 may be in operative connection with the input device(s) 32, the output device(s) 34, and the transaction function device(s) 36. The exemplary embodiment may further include at least one terminal control software component 40 operative in the computer 30. The terminal control software components may be operative to control the operation of the machine by both a consumer and an authorized user such as a service technician. For example such terminal control software components may include applications which enable a consumer to dispense cash, deposit a check, or perform other transaction functions with the machine. In addition, the terminal control software components may include applications which enable a service technician to perform configuration, maintenance, and diagnostic functions with the machine.

Exemplary embodiments of the automated banking machine 10 are operative to communicate with a transaction processing server which is referred to herein as an ATM host banking system 42. Such an ATM host banking system 42 is operative to authorize the automated banking machine 10 to perform transaction functions for users such as withdrawing cash from an account through operation of the cash dispenser 24, depositing checks or other items with the depository mechanism 26, performing a balance inquiry for a financial account and transferring value between accounts.

In this described embodiment, the card reader 22 may move a card provided by a user into and/or out of the card reader with one or more patterns of motion which interfere with the ability of a magnetic sensor of an unauthorized skimming device from correctly reading the card data from the magnetic stripe of the card.

Figure 3:
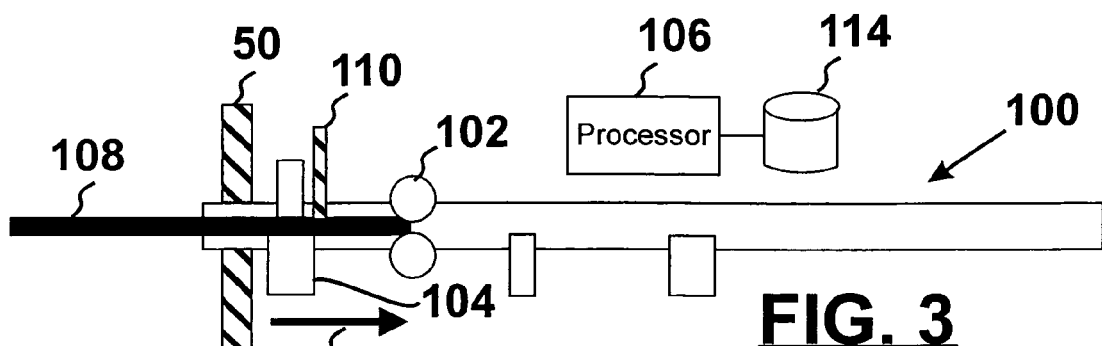
FIGS. 3–7 show schematic views of a card at various locations after the card is inserted into a card reader.

FIG. 3 shows a cross-sectional schematic view of an embodiment of the card reader 100. In this described embodiment, a user may initially insert by hand a card 108 into the card reader until the card contacts an entrance roller 102. A sensor 104 associated with the card reader may be operative to detect when the card is adjacent the entrance roller and cause a processor 106 in the card reader to cause a motor to turn the entrance rollers and begin moving the card. The motor and entrance rollers correspond to components of a card transport of the card reader. As defined herein a card transport corresponds to one or more components that are operative to move a card. Such components may include one or more motors, rollers, belts and/or other components operative to move a card responsive to a processor in the card reader.

In embodiments of the card reader, the sensor 104 and/or other sensors described below may correspond to any sensor that is operative to detect the presence and/or absence of the card at a particular location or range of locations in the card reader. For example, such sensors may operate mechanically by sensing when a card physically contacts the sensor. Also, such sensors may operate optically or acoustically by transmitting a light or sound wave and detecting whether the light or sound wave is being blocked or otherwise altered by the presence of the card. Such sensors may also include a magnetic sensor operative to generate a signal responsive to movement of the magnetic stripe of the card.

For example, in some embodiments, the sensor 104 may correspond to a magnetic sensor referred to as a "pre-head" sensor adjacent a gate 110 of the card reader. Such a "pre-head" sensor may produce a signal as the card (and associated magnetic stripe) is manually moved by the user into the card reader and adjacent the sensor. However upon contacting the entrance roller(s) 102, the card will stop and the signal sensed by the magnetic "pre-head" sensor may drop to zero or another level indicative of the card remaining stationary. This change in the output of the "pre-head"

sensor may be detected by the processor and trigger the processors to cause the transport to begin moving the card.

Once the card reader begins to move the card after it has been inserted into the card reader by a user, the processor may cause the card transport to move the card with patterns of motions that vary from one card insertion to another card insertion. As defined herein each common set of motions performed by the card reader such as the motions involved within inserting a card, ejecting the card, and/or retrieving the card are refereed to as a cycle of the motions. The repeated performance of one or more of these sets of motions (e.g., insertion, ejection and/or retrieving motions) for different cards or the same card are refereed to herein as further cycles of the motions. As will be described in more detail below, one or more motions of the card produced by the card transport will vary from cycle to cycle.

For example, the motion of the card during the initial insertion of the card may include continuously moving the card at a first or normal speed level in a first direction 112 for a first time period. Such a first or normal speed level may correspond to a speed which is sufficient to enable a magnetic sensor to read card data from the card. In one embodiment a normal speed may correspond to 190 mm/s. However, it is to be understood that in alternative embodiments the card transport may begin moving the card at other speed levels above or below a level operative to enable the magnetic sensor to read the card data from the card.

Figure 4:
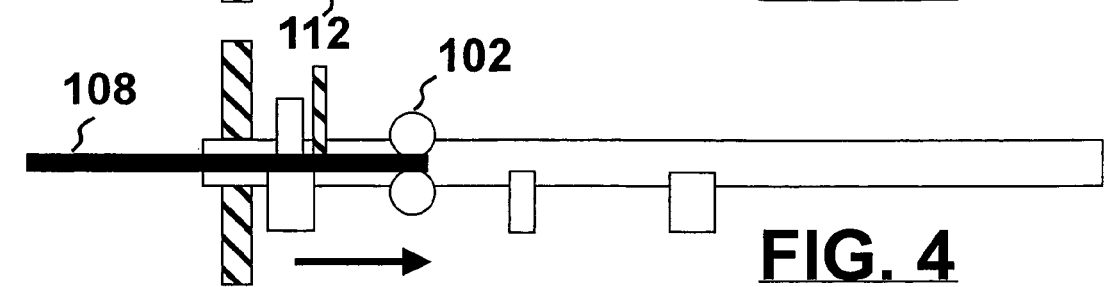

FIG. 4 shows the card at the end of the first time period. During the first time period, the card may move a relatively short distance relative to the length of the card, but which distance is sufficient to give the user a sense that the card reader is working properly and is automatically moving the card into the reader without further pushing force by the user. For example in one embodiment, at the end of the first time period the card may be moved 4–5 mm.

Subsequent to the first time period, the card reader may begin to continuously move the card at a relatively slower second speed in the first direction for a second time period. The second speed may correspond to a speed which is sufficiently slow to make a signal generated by a magnetic sensor in the card reader (such as the "pre-head" sensor or an unauthorized magnetic sensor) at a level which generally is not distinguishable from noise and/or at a level which hampers the ability of a magnetic sensor from reading card data from the card. In one embodiment this second speed may correspond to 25 mm/s. However, it is to be understood that in alternative embodiments the card transport may move the card during the second time period at other speed levels. Also, in alternative embodiments, the first time period and the second time period may correspond to the same time period with the card moving at the same continuous speed such as the described second speed.

In this described embodiment of the card reader, the second time period may have a duration that various each time the card reader is used responsive to at least one variable parameter determined by the processor. From cycle-to-cycle the duration of the second time period may vary randomly or may vary according to a repeating predetermined pattern or sequence responsive to the determined variable parameter.

Figure 5:
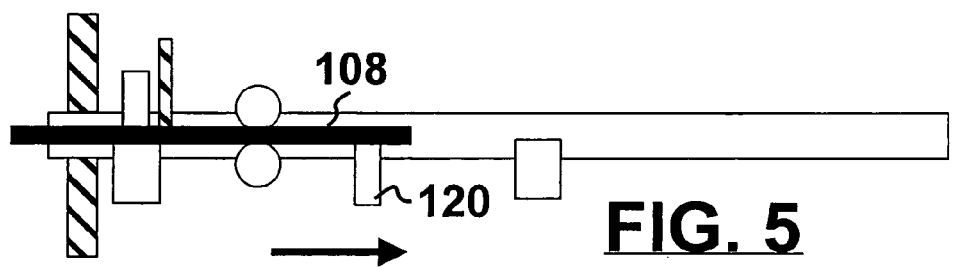

FIG. 5 shows the card at the end of the second time period. In this described example, from cycle to cycle the card transport may move the card at the second speed until the card reaches a sensor 120 within the card reader. The processor may be responsive to the sensor 120 detecting the card to determine an additional duration or distance responsive to the variable parameter and may cause the second time period to continue for the additional duration or distance. As a result the card may continue to move at the second speed in the first direction to a position passed the sensor 120 during the second time period.

In an embodiment, the card reader may include a data store 114 which includes therein a sequence of parameters with which the processor is responsive thereto when determining the duration of the second time period. When the card is initially inserted into the card reader or at other times, the processor may select one of the parameters from the sequence and cause the card transport to move the card for the second time period which is determined responsive to the parameter selected form the data store. For the next cycles (i.e., the next insertion of a different card or the same card), the processor may be operative to select the next parameter in the sequence from the data store and cause the second time period for that next cycle to have a duration responsive to this next parameter. When the processor has selected the last parameter in the sequence, the processor for the next cycle may again select the first parameter in the sequence and for each subsequent cycle, the processor may continue to select parameters according to the original order of the sequence.

As an example, the variable parameters stored in the data store may correspond to a repeating sequence of data values such as: 5, 20, 15, 25. Such data values, for example, may directly correspond to units of time (e.g., milliseconds) for which the card transport continues to move the card after a sensor detects the card (or from the beginning of the second time period). In other exemplary embodiments, such parameters may not directly correspond to particular units of time, but rather may correspond to other variable data that is capable of causing the card transport to move the card different amounts of time and/or distances during the second time periods for each cycle.

In addition, rather than retrieving such variable parameters from a data store, it is to be understood that in alterative exemplary embodiments, the processor may be operative to generate the variable parameters used to vary the duration of the second time period using a random number generation algorithm or other software function or hardware device operative to produce variable parameters. In an exemplary embodiment, the processor may determine or calculate the variable parameters based on data associated with the current transaction or previous transactions carried out with the ATM and/or the card reader. Such data, for example, may correspond to the amount of time a user carried out one or more functions with the ATM, and/or the amount of time between the insertion and ejection of a card for one or more previous transactions. Such data may also be based on other cumulative statistics associated with the operation of the ATM and/or card reader for a plurality of previous transactions. In further exemplary embodiments, transaction data used to carry out transactions with the ATM may be used to determine the variable parameters. Such transaction data may include data from a card (e.g. account number, card expiration) or other transaction data (e.g. amount of cash dispensed and/or transferred) for one or more previous transactions carried out with the ATM and/or card reader.

Following the second time period, the card reader may begin to move the card with a repeating stop/start motion which lasts for a third time period. In an exemplary embodiment, the card may stop and start moving at least five times during the third time period. For each stop the card may remain stationary for a sufficient time to cause for at least 10 msec a signal produced by a magnetic sensor in the card reader (such as the pre-head sensor or an unauthorized magnetic sensor) to have a level which generally cannot be distinguished from noise. As an example, for each stop the card may remain stationary for 10 msec. However, it is to be understood that in alternative exemplary embodiments, the stops may have durations which vary from stop to stop randomly, or according to a pattern or sequence.

Between stops the card transport may move the card at a speed which is relatively faster then the second speed. For example, the card transport may move the card during stops at a speed which corresponds to the first speed. Also for example, the card transport may move the card at a speed and for a duration between stops which results in the average speed of the card (including times when the card is stopped) during the third time period averaging at least one quarter the speed of the first or normal speed. In addition the durations during which the card moves between stops may be sufficiently short to prevent a magnetic scanning device from being able to compile accurate card data from the card during the third time period.

Figure 6:
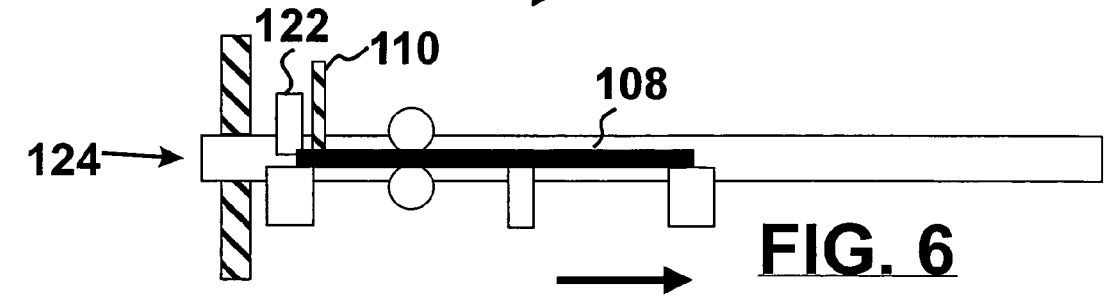

In this described exemplary embodiment, the third time period may end when a sensor detects the presence or absence of the card at a predetermined position within the card reader. FIG. 6, shows the card at the end of the third time period. In this described embedment, the card reader may include a sensor 122 adjacent a card reader gate 110 and/or an entrance opening 124 to the card reader. For example, in an embodiment, the sensor 122 may correspond to a mechanical switch which is turned on responsive to contact by the card which urges and/or displaces a portion of the switch as the card passed adjacent the switch. In this described embodiment, when the card is no longer adjacent the sensor 122, the sensor is operative to change states such as changing from an "on" state to an "off" state. Responsive to the change in state of the sensor 122, the processor may be operative to end the third time period. Here, such a change in state of the sensor 122 corresponds to the sensor detecting the absence of the card. However, in other embodiments the sensor 122 may be located so as to trigger the end of the third period upon the detection of the presence of the card.

Because, the third time period ends at a predetermined position responsive to a sensor, the distance the card travels during the third period will vary in inverse proportion with respect to the distance the card travels during the second period. The variation in the distance the card travels during the third time period; the duration of the third time period; and/or the number of stops during the third time period, from cycle to cycle will thus be a function of the variable parameter.

After the third time period, the card reader may begin continuously moving the card at a third speed for a fourth time period which moves the card passed a magnetic sensor 130. The fourth speed may correspond to the first speed or another speed which is sufficient to enable the magnetic sensor 130 to read card data such as account information from the magnetic stripe of the card. Such card data may be communicated from the card reader to a computer in the ATM to further the carrying out of a financial transaction by the ATM.

The end of the fourth time period may be triggered by a sensor detecting the presence and/or absence of the card at a predetermined position. In this described exemplary embodiment, at the end of the fourth time period, the card transport is operative to stop the card and keep the card in a stationary position (shown in FIG. 7) until the card reader receives a command message (such as from an ATM) which causes the card reader to eject the card from the card reader.

The ejection of the card may include a pattern of motions in the reverse order to those described previously with respect to the insertion of the card. For example, the ejection pattern of motions may include the card reader continuously moving the card at a fourth speed for a fifth time period in a second direction 140 opposite the first direction. The fourth speed may correspond to the first speed or a different speed. For example in one embodiment, the fourth speed may correspond to a velocity that is relatively faster then the first speed.

Figure 7:
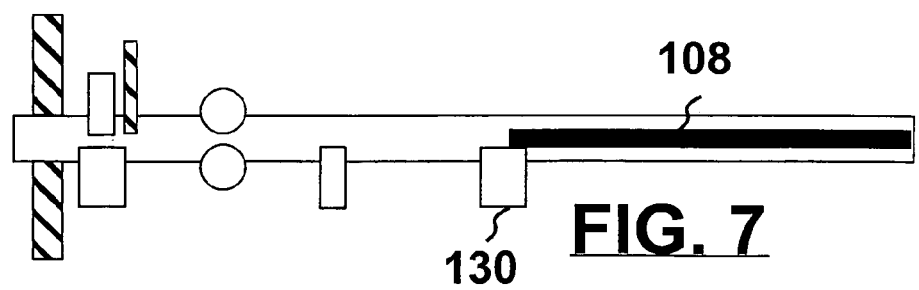
Figure 8:
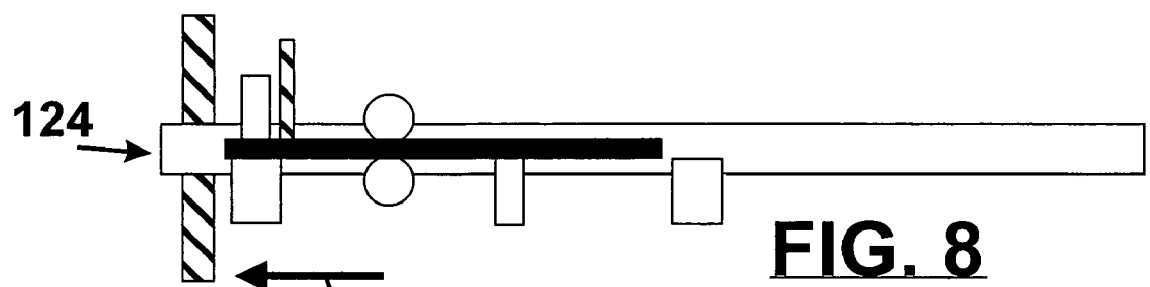
FIGS. 8–10 show schematic views of a card at various locations as the card is ejected from the card reader.
Figure 9:
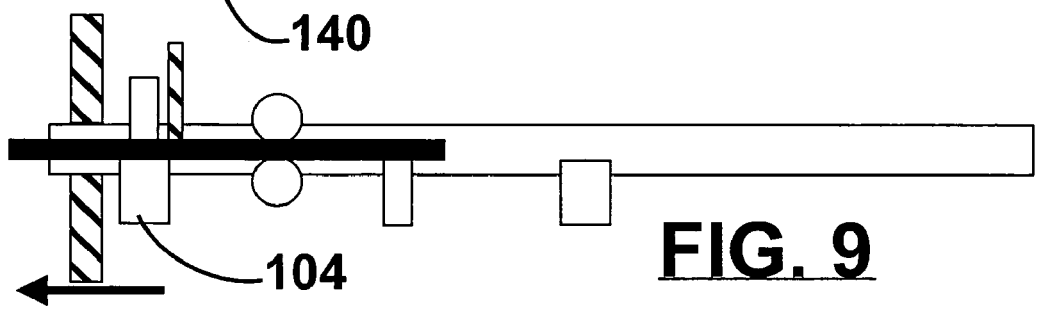

FIG. 8 shows the card at the end of the fifth time period having moved from the stationary position shown in FIG. 7. The fifth time period may end with the card at a position before the card starts its protrusion outside the opening 124 to the card reader. After the fifth time period, the card reader may begin moving the card with the repeating stop/start motion described previously in the second direction for a sixth time period that various in duration from cycle to cycle. For example, the duration of the sixth time period and/or the distance the card moves during the sixth time period may vary responsive to the variable parameter determined during the insertion of the card and/or may vary responsive to a newly determined variable parameter. FIG. 9 shows the card at the end of the sixth time period. In an embodiment, the sixth time period may continue until the card protrudes from the card reader between 8 mm and 13 mm.

After the sixth time duration, the card reader may continue moving the card in the second direction at a fifth speed for a seventh time period until the card reaches an ejected position. Such a fifth speed may be relatively slower than the first speed and correspond to a speed such as the second speed which is sufficiently slow to make a signal generated by a magnetic sensor in the card reader (such as the "pre-head" sensor or an unauthorized magnetic sensor) at a level which is generally not distinguishable from noise and/or at a level which hampers the ability of a magnetic sensor from reading card data from the card.

Figure 10:
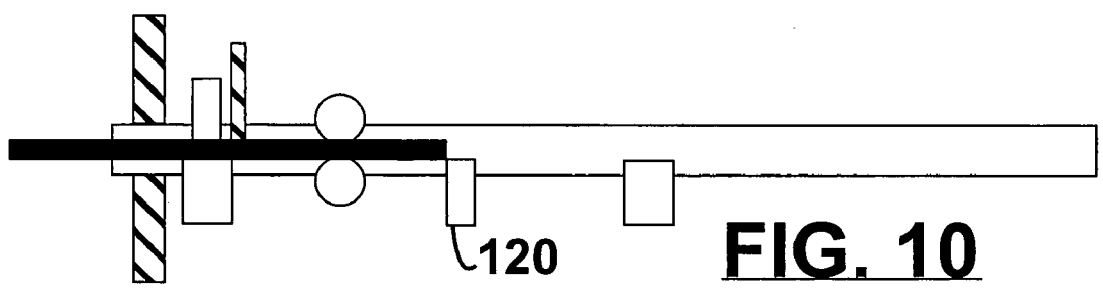

FIG. 10 shows the card at the end of the seventh time period. In this described embodiment, at the end of the seventh time period, the card is stopped and remains stationary. The stopping of the card at the end of the seventh time period may be triggered by a sensor. For example, in an embodiment, the processor may be responsive to the sensor 120 no longer sensing the presence of the card to cause the card to stop.

In an embodiment, if the card in the ejected position (shown in FIG. 10) is pushed in by the user, the card reader may be operative to again move the card in the second direction until the card again reaches the ejected position.

In the event that the card is not taken by the user after a predetermined amount of time, the card reader is operative to retrieve the card and store it internally within the ATM. The retrieval pattern of motions may include the card reader moving the card in the first direction in a similar matter as the previously described insertion motions corresponding to the third through fourth time periods. For example during the retrieval of the card (after being ejected) the card reader may continuously move the card in the first direction at the second speed until detected by the sensor 120 and then continue for a variable distance which varies responsive to the variable parameter determined during the insertion phase or a newly determined variable parameter. After moving the additional amount of time (which varies from cycle to cycle), the card reader may move the card in the same manner described previously with respect to the third time period (e.g., repeated stop/start motion) and/or the fourth time period (e.g., continuous motion at the third speed). At the end of the retrieval phase, the card reader may be operative to move the card into a storage area and out of the way of subsequent cards inserted into the card reader.

Figure 11:
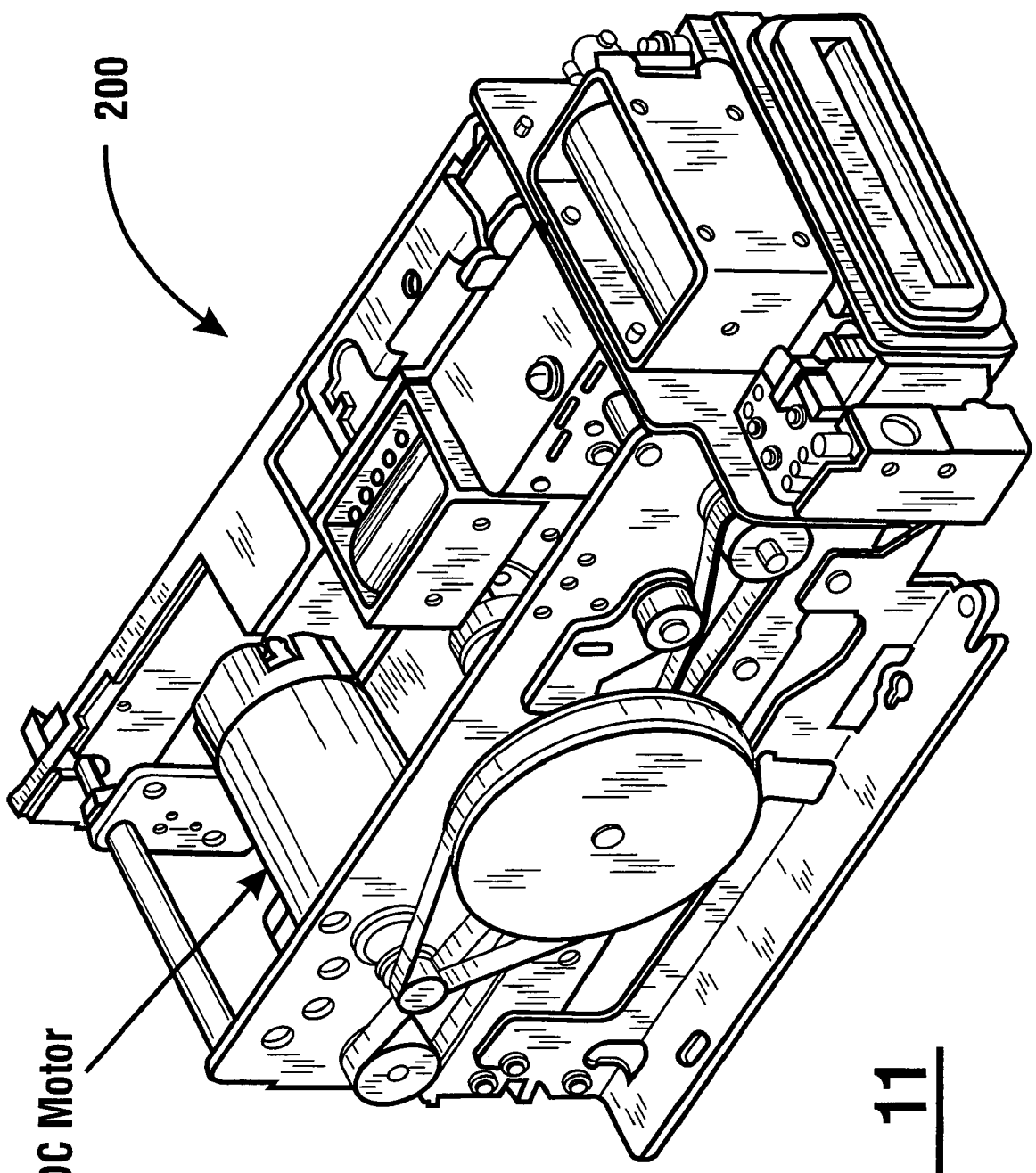
FIG. 11 shows a perspective view of a motorized card reader adapted to move a card through the positions shown in FIGS. 3–10.

An exemplary embodiment may include adapting a preexisting card reader device to be capable of carrying out the described insertion, ejection, and retrieval motions described previously. For example, with respect to a motorized card reader such as a Diebold, Incorporated Model No. 49-201323-000A ("Diebold card reader"), the card reader may be adapted to include the necessary firmware and/or data store of variable parameters as discussed previously to be capable of carrying out the described embodiments of the insertion, ejection, and retrieval motions. Preexisting sensors in the Diebold card reader, such as a pre-head sensor, a PD1 photo sensor, and a SW1 micro switch may correspond respectively to the previously discussed sensors 104, 120 and 122 shown in FIGS. 1–10. A perspective view of a Diebold motorized card reader 200 is shown in FIG. 11. However, it is to be understood that in alternative embodiments, other configurations of motorized card readers may be adapted to carry out the previously described card motions operative to minimize the opportunity for an unauthorized skimming device to acquire card data.

In addition to the motions described above, it is to be understood that the card reader may be operative to have the card undergo other motions capable of hindering the effectiveness of an unauthorized skimming device. For example, during the third time period or during other time periods (such as the second time period), the card reader may temporarily move the card in reverse (the second direction), and/or vary the velocity of the described speeds.

Also in further embodiments, the automated banking machine which includes the described card reader may include other features operative to hinder and/or detect an unauthorized skimming device. For example, a radiation sensor, a camera or other sensor may be mounted on or off the ATM in a position operative to detect/view the card reader as the card is inserted, ejected, and/or retrieved. Such a camera or other sensor may be capable of being used to determine a distance the card extends outside of the actual fascia (50) or a fake fascia of a skimming device at times, such as when the card contacts the front rollers (FIG. 3); is at the ejection position (FIG. 10); or at other predetermined positions. If the measured distance is below a predetermined threshold for the position of the card, there may be an unauthorized skimming device adjacent the card reader. As a result the ATM may be operative to take the ATM out of service and/or send a message to a host system or other server which is operative to notify a party/entity of the existence of a potential skimming device. Further examples of anti-fraud ATM features which may be used in combination with the described techniques for hindering/detecting an unauthorized skimming device are shown in U.S. patent application Ser. No. 10/601,813 filed Jun. 23, 2003, Ser. No. 10/832,960 filed Apr. 27, 2004, and 60/815,287 filed Jun. 20, 2006 which are hereby incorporated herein by reference.

Computer software/firmware instructions used in operating one or more processors in the card reader, and/or an automated banking machine that includes the card reader may be loaded from computer readable media or articles of various types into the respective processors. Such computer software may be included on and loaded from one or more articles such as diskettes or compact disks. Such software may also be included on articles such as hard disk drives, tapes or ready only memory devices. Other articles which include data representative of the instructions for operating computers in the manner described herein are suitable for use in achieving operation of automated banking machines and systems in accordance with exemplary embodiments.

The exemplary embodiments of the card reader, automated banking machines, and systems described herein have been described with reference to particular software components and features. Other embodiments of the invention may include other or different software components which provide similar functionality.

Thus the new card reader achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. An apparatus comprising:
   a card reader adapted for use in an automated banking machine;
   at least one processor, wherein the at least one processor is operative to determine at least one variable parameter;
   wherein the card reader includes at least one magnetic sensor in operative connection with the at least one processor;
   a card transport extending in the card reader and in operative connection with the at least one processor, wherein the card transport is operative to move a card received in the card transport through at least one cycle between a first position and a second position within the card transport;
   wherein in the cycle:
      the at least one processor is operative to cause the card transport to continuously move the card from the first position in a first direction for a first time period at a first speed;
      wherein subsequent to the first time period, the at least one processor is operative to cause the card transport to continuously move the card in the first direction for a second time period at a second speed, wherein the second speed is slower than the first speed;
      wherein subsequent to the second time period the at least one processor is operative to cause the card transport to operate for a third time period, wherein during the third time period card moves in the first direction and stops and starts moving more than five times;

wherein both the second and third time periods vary in duration from cycle to cycle responsive to the at least one variable parameter determined by the at least one processor; and wherein subsequent to the third time period the at least one processor is operative to cause the card transport to move the card in the first direction for a fourth time period to the second position at a third speed which is greater than the second speed, wherein during the fourth time period the magnetic sensor is operative to read from the card, information stored magnetically on the card.

2. The apparatus according to claim 1, wherein during the third time period, each stop of the card has a duration of at least about 10 milliseconds (ms).

3. The apparatus according to claim 1, wherein in the cycle, the at least one processor causes the card transport to move the card a distance in the first direction during the third time period which varies in inverse proportion to a distance in the first direction the card transport causes the card to move during the second time period.

4. The apparatus according to claim 1, wherein from cycle to cycle the at least one processor causes the card transport during the third time period to stop and then start movement of the card a different number of times.

5. The apparatus according to claim 1, wherein from cycle to cycle the at least one variable parameter is randomly generated by the at least one processor.

6. The apparatus according to claim 1, wherein from cycle to cycle the at least one processor is operative to determine the at least one variable parameter responsive to a predetermined sequence.

7. The apparatus according to claim 1, further comprising a data store in operative connection with the at least one processor, wherein from cycle to cycle the at least one processor is operative to determine the at least one variable parameter responsive to a plurality of different predetermined parameters stored in the data store.

8. The apparatus according to claim 1, wherein from cycle to cycle the at least one processor is operative to cause the third time period to have different durations responsive to different respective variable parameters determined by the at least one processor.

9. The apparatus according to claim 1, wherein from cycle to cycle the at least one processor is operative to cause the card transport to move the card during the third time period different distances with respect to the first position.

10. The apparatus according to claim 9, further comprising at least one card position sensor, wherein the at least one card position sensor is in operative connection with the at least one processor, wherein the at least one processor is operative responsive to the at least one card position sensor detecting at least one of the presence or absence of the card during the third time period, to cause the card transport to begin moving the card to commence the fourth time period.

11. The apparatus according to claim 10, further comprising at least one further card position sensor, wherein the further card position sensor is in operative connection with the at least one processor, and wherein the at least one processor is operative responsive to the at least one further card position sensor detecting at least one of the presence or absence of the card during the second time period, to cause the card transport to continue moving the card in the first direction for an addition time period before the third time period, wherein the additional time period is determined by the at least one processor responsive to the at least one variable parameter.

12. The apparatus according to claim 11, further comprising a further magnetic sensor, wherein the further magnetic sensor is in operative connection with the at least one processor, and wherein the further magnetic sensor is operative to detect movement of the card prior to the first time period, wherein the at least one processor is operative responsive to the further magnetic sensor not detecting movement of the card, to cause the card transport to begin moving the card to commence the first time period.

13. The apparatus according to claim 1, wherein the at least one processor is operative to determine at least one further variable parameter; and further comprising:

an opening adjacent the card transport, wherein the at least one processor is operative responsive to receipt of an eject command generated through operation of the automated banking machine to cause the card transport to continuously move the card in a second direction that is opposed of the first direction and toward the opening, at a fourth speed that is greater than the third speed, for a fifth time period, wherein prior to the card extending in the opening, the at least one processor is operative to cause the card transport to operate during a sixth time period, wherein during the sixth time period the card transport stops and then starts the card moving in the second direction more than five times, wherein duration of the sixth time period varies from cycle to cycle responsive to the at least one further variable parameter determined by the at least one processor, wherein the card extends in the opening after the sixth time period.

14. The apparatus according to claim 13, further comprising:

at least one card position sensor, wherein the at least one card position sensor is in operative connection with the at least one processor, wherein subsequent to the sixth time period the at least one processor is operative to cause the card transport to continuously move the card in the second direction for a seventh time period at a speed which is slower than the third speed, wherein the at least one processor is operative responsive to the at least one card position sensor detecting at least one of the presence or absence of the card during the seventh time period, to cause the card transport to stop moving the card.

15. The apparatus according to claim 1, and further comprising:

a cash dispenser, wherein the cash dispenser is in operative connection with the at least one processor, wherein the at least one processor is operative to cause the cash dispenser to operate, wherein operation of the cash dispenser is responsive to data read from the card.

16. A method comprising:

a) through operation of at least one processor, determining at least one variable parameter;

b) through operation of the at least one processor, causing a card transport in a card reader to continuously move a card in a first direction for a first time period at a first speed;

c) subsequent to the first time period, through operation of the at least one processor, causing the card transport to continuously move the card in the first direction for a second time period at a second speed, wherein the second speed is slower than the first speed, wherein the second time period has a duration corresponding to the at least one variable parameter determined in (a);

d) subsequent to the second time period, through operation of the at least one processor, causing the card transport to move the card in the first direction during a third time period, wherein during the third time period the card transport causes the card to stop and then start moving more than five times, wherein the third time period has a duration corresponding to the at least one variable parameter determined in (a);

e) subsequent to the third time period, through operation of the at least one processor, causing the card transport to move the card in the first direction for a fourth time period at a third speed which is greater than the second speed;

f) during the fourth time period, reading with a magnetic sensor in the card reader, card information stored magnetically on the card.

17. The method according to claim 16, further comprising:
repeating (a) through (f) with the card or a further card, wherein each performance of (a) through (f) comprises a cycle, wherein in (c) and in (d) both the second and third time periods respectively, vary in duration from cycle to cycle responsive to the respective at least one variable parameter determined by the at least one processor in the immediately preceding step (a).

18. The method according to claim 17, wherein in (d) during the third time period, each stop of
the card has a duration of at least about 10 milliseconds (ms).

19. The method according to claim 17, wherein for each cycle a distance the card moves in the first direction during the third time period in (d), varies in inverse proportion to a distance the card moves in the first direction during the second time period in (c) corresponding to the respective cycle.

20. The method according to claim 17, wherein from cycle to cycle the card transport causes at least one of the card or the further card during the third time period in (d) to stop and then start a different number of times.

21. The method according to claim 17, wherein from cycle to cycle the respective distances the card moves during the third time period in (d) varies responsive to different respective variable parameters determined by the at least one processor in (a) of the respective cycle.

22. The method according to claim 17, wherein in (a) the at least one processor is operative to randomly generate the at least one variable parameter.

23. The method according to claim 17, wherein in (a) the at least one processor is operative to determine the at least one variable parameter responsive to a predetermined sequence.

24. The method according to claim 17, wherein in (a) the at least one processor is operative to determine the at least one variable parameter responsive to a plurality of different predetermined parameters stored in a data store in operative connection with the at least one processor.

25. The method according to claim 17, wherein from cycle to cycle the at least one processor is operative to cause the card transport to move the card or the further card during the third time period in (d), different distances.

26. The method according to claim 16, further comprising:
(g) during the third time period, detecting with a card position sensor in the card reader at least one of the presence or absence of the card;
wherein the at least one processor is responsive to (g) to cause (e) to be carried out.

27. The method according to claim 26, wherein (c) includes detecting at least one of the presence or absence of the card during the second time period with a further card position sensor in the card reader, wherein (c) further includes through operation of the at least one processor causing the card transport to continue moving the card for an addition time period which is determined responsive to the at least one variable parameter determined in (a).

28. The method according to claim 16, further comprising
g) prior to (b), detecting with a further magnetic sensor that the card has stopped moving;
wherein the at least one processor is responsive to (g) to cause (b) to be carried out.

29. The method according to claim 16, further comprising:
g) receiving with the at least one processor an eject command responsive to operation of an automated banking machine;
h) through operation of the at least one processor responsive to (g), causing the card transport to continuously move the card in a second direction that is opposite the first direction toward an opening at a fourth speed that is greater than the third speed for a fifth time period;
i) prior to the card extending in the opening, through operation of the at least one processor, causing the card transport to move the card in the second direction during a sixth time period, wherein during the sixth time period the card transport causes the card to stop and then start moving more than five times, wherein the sixth time period has a duration which corresponds to the at least one variable parameter, wherein after the sixth time period the card extends in the opening.

30. The method according to claim 29, further comprising
j) subsequent to the sixth time period, through operation of the at least one processor, causing the card transport to continuously move the card in the second direction for a seventh time period at a speed which is slower than the third speed;
k) during the seventh time period detecting with a card position sensor in the card reader at least one of the presence or absence of the card;
wherein in (j) the at least one processor is responsive to (k) to cause the card transport to stop the card.

31. The method according to claim 16, wherein between the beginning of the first time period and the beginning of the fourth time period, at least once causing responsive to operation of the at least one processor, the card to move in a second direction opposite the first direction.

32. The method according to claim 16, and further comprising:
prior to (b) receiving the card into an interior area of the automated banking machine;
subsequent to (f), operating the at least one cash dispenser of the automated banking machine to dispense cash from the machine, wherein the at least one processor causes the cash dispenser to operate responsive to the card information.

33. Computer readable media bearing instructions which are operative to cause at least one processor in an automated banking machine to cause a card reader to carry out the method steps recited in claim 16.

* * * * *